US009473588B2

(12) United States Patent
Wang et al.

(10) Patent No.: US 9,473,588 B2
(45) Date of Patent: Oct. 18, 2016

(54) DATA PROCESSING METHOD AND SYSTEM

(71) Applicant: Alibaba Group Holding Limited, Grand Cayman (KY)

(72) Inventors: Kai Wang, Hangzhou (CN); Fang Wang, Hangzhou (CN); Yunchang Wu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 439 days.

(21) Appl. No.: 14/025,664

(22) Filed: Sep. 12, 2013

(65) Prior Publication Data

US 2014/0074914 A1 Mar. 13, 2014

(30) Foreign Application Priority Data

Sep. 13, 2012 (CN) .......................... 2012 1 0340255

(51) Int. Cl.
H04L 29/08 (2006.01)
(52) U.S. Cl.
CPC ........... H04L 67/32 (2013.01); H04L 67/2833 (2013.01)
(58) Field of Classification Search
None
See application file for complete search history.

(56) References Cited

U.S. PATENT DOCUMENTS

| | | | | |
|---|---|---|---|---|
| 8,762,288 B2 * | 6/2014 | Dill | ........................ | G06Q 30/02 705/16 |
| 2001/0034663 A1 | 10/2001 | Teveler et al. | | |
| 2002/0038277 A1 * | 3/2002 | Yuan | .................. | G06Q 30/0601 705/37 |
| 2003/0004834 A1 | 1/2003 | Yamazaki | | |
| 2004/0172361 A1 | 9/2004 | Nakata et al. | | |
| 2004/0181493 A1 | 9/2004 | Cross et al. | | |
| 2005/0033604 A1 | 2/2005 | Hogan | | |
| 2005/0096986 A1 | 5/2005 | Taylor et al. | | |
| 2006/0212407 A1 * | 9/2006 | Lyon | ...................... | G06Q 20/04 705/71 |
| 2006/0287953 A1 | 12/2006 | Chauhan | | |
| 2007/0214077 A1 * | 9/2007 | Barnes | ................. | G06Q 40/025 705/38 |
| 2009/0254381 A1 | 10/2009 | Frederickson et al. | | |
| 2010/0223154 A1 * | 9/2010 | Frohwein | ............... | G06Q 20/10 705/26.1 |
| 2010/0268557 A1 * | 10/2010 | Faith | ...................... | G06Q 20/00 705/7.29 |
| 2011/0035294 A1 | 2/2011 | Mizrah | | |
| 2011/0161211 A1 | 6/2011 | Zhang et al. | | |

(Continued)

FOREIGN PATENT DOCUMENTS

| | | |
|---|---|---|
| CN | 101567071 A | 10/2009 |
| VG | CN 101567071 A * | 10/2009 |

OTHER PUBLICATIONS

PCT Search Report and Written Opinion mailed May 6, 2014 for PCT Application No. PCT/US13/59518, 7 Pages.

(Continued)

*Primary Examiner* — Natisha Cox
(74) *Attorney, Agent, or Firm* — Lee & Hayes, PLLC

(57) ABSTRACT

The present disclosure provides techniques for data processing. These techniques may transport, by a computing device, individual retrieving requests for second data corresponding to a first client that sends the retrieving requests for first data into the order pool. The computing device may calculate an initial value of a second total amount of the second data, and then notify a platform of a third party to send the corresponding first data to the first client. The computing device may determine corresponding qualification after retrieving requests for the second data in the order pool are changed. The computing device may return third data to a data processing server of the third party in response to qualification determination. These techniques reduce usage of network resource and therefore increase efficacy of the networking.

20 Claims, 2 Drawing Sheets

(56) References Cited

U.S. PATENT DOCUMENTS

| | | |
|---|---|---|
| 2011/0276484 A1 | 11/2011 | Pearson et al. |
| 2012/0054097 A1* | 3/2012 | Frohwein ............. G06Q 20/108 705/40 |
| 2012/0191485 A1 | 7/2012 | Boyer et al. |
| 2013/0132718 A1* | 5/2013 | Agrawal ............... H04L 9/3268 713/158 |
| 2015/0149359 A1* | 5/2015 | Forte .................... G06Q 20/325 705/44 |

OTHER PUBLICATIONS

Office Action Dated Feb. 25, 2016 in Chinese Application No. 201210340255.3.

* cited by examiner

DATA PROCESSING METHOD AND SYSTEM

CROSS REFERENCE TO RELATED PATENT APPLICATIONS

This application claims priority to Chinese Patent Application No. 201210340255.3, filed on Sep. 13, 2012, entitled "Data Processing Method and System," which is hereby incorporated by reference in its entirety.

TECHNICAL FIELD

The present disclosure relates to computer technology and, more specifically, to data processing.

BACKGROUND

In general, a first client may request first data from a data processing server of a third party. The first client receives a retrieving request for second data from a second client, wherein the retrieving request for second data is the second client's request that requests second data stored in the first client. The first client may send a retrieving request for the first data to a first server so that the first server, in accordance with the retrieving request, notifies the data processing server of the third party to send the first data, which is calling data corresponding to the second data, to the first client.

After the completion of the retrieving request for the second data has been confirmed, third data sent from the second client is taken as a compensation data that compensates the first data to send to the data processing server of the third party. The third data, sent from the second client to the first client, is a confirmation data that confirms the completion of the retrieving request for the second data.

In such a process as described above, with respect to the first client, once each retrieving request for the second data is received, it is necessary to send one retrieving request for the first data to the first server in order to let the first server notify the data processing server of the third party to send the first data to the first client. Then after the confirmation of the retrieving request for the second data is completed, the third data is sent back to the data processing server of the third party. Therefore, when the first client receives a plurality of the retrieving requests for the second data, the first client may generate a large amount of retrieving requests for the first data, a large amount of the first data that corresponds to the retrieving requests, and a larger amount of the third data required to be returned as well, if a large number of clients similar to the first client exist in the network. Consequently, with regard to the network, the above method for processing data requires the transportation of a tremendous amount of data and therefore occupies network resources as well as slows down the efficacy of network. Regarding the first server, a lot of data resources of the first server will be occupied and therefore cause heavy loading of the first server, since the first server also needs to process a large amount of data.

An example for explaining the above can be found in a conventional transaction process of a networking platform. For example, a seller intends to apply for a loan by using an account receivable (AR) generated in a transaction order that is not yet received by a buyer. Suppose that a first server associated with the seller requests a loan from a server of a third party of a financial organization. The transaction order is generated after the buyer clicks a commodity item with a specific price in the networking platform. Meanwhile, with respect to the seller, he/she obtains a prospective view that the buyer should pay for the transaction order. The seller cannot really receive the money before the buyer confirms the product is received. Accordingly, in accordance with the transaction order, the seller can request the server of the third party of financial organization to lend the money with credit as the same as the order through the first server. The server of the third party of financial organization thus loans the money with the same credit to the seller in accordance the transaction order. If the buyer has confirmed receipt of the product and paid the money, the first server would return the money paid by the buyer to the server of the third party of financial organization. However, in the practice, with respect to the seller, there is a problem that for every single transaction order the first server needs to apply a loan to the server of the third financial organization. In other words, in practice, if the seller sells a large amount of commodity items, there will be a large amount of transaction orders. Therefore, using the method for processing data as described above, the transfer data is tremendous; so the transfer efficacy is low and a load on the first server is overwhelming.

SUMMARY

The present disclosure provides methods and systems for processing data to overcome an existing problem in conventional techniques. For example, the procedure of data processing using conventional techniques is complicated and the first server needs to process a large amount of data. In addition, every single transaction order has to be processed within a single process, causing and a heavy load for the first server.

Embodiments of the present disclosure relate to a method for processing date. The method may include receiving, by a computing device, a retrieving request for a first data from a first client, wherein the retrieving request for the first data is sent from the first client to request a data processing server of a third party to send the first data to the first client. The computing device may then acquire each retrieving request for a second data that is sent to the first client from each second client based on the retrieving request for the first data. The computing device may transport the retrieving requests for the second data into a request pool, and calculate an initial value of a second total amount of the second data. The computing device may notify a platform of the third party to send the corresponding first data to the first client based on the second total amount, and record a first total amount of the first data.

In some embodiments, the computing device may transport any new retrieving request for the second data into the request pool while any new retrieving request for the second data is acquired. After a confirmation message that the retrieving request for the second data has been accomplished is received, the computing device may remove the retrieving request for the second data from the request pool, and restart the computation of the second total amount in accordance with, in the request pool, the second data of the retrieving request for the second data.

In some embodiments, the computing device may compare the second total amount with the first total amount as a comparing result, and determine whether a total of a third data or a part of the third data is to be returned to the data processing server of the third party or not in accordance with the comparing result, wherein the third data sent from a second client to the first client is corresponding to a confirmation data that confirms the accomplishment of the retrieving request for the second data.

In some embodiments, the computing device may restart the computation of the first total amount that is obtained as a remaining first total amount by subtracting the third data that is returned to the data processing server of the third party from the first total amount if the total of the third data or the part of the third data has returned to the data processing server of the third party.

In some embodiments, after the retrieving request for the first data from the first client is received, or after the initial value of the second total amount of the second data is computed, the computing device may determine whether the first client is qualified as being allowed to send the retrieving request for the first data.

In some embodiments, the computing device may suspend the retrieving request for the first data sent by the first client if the first client is not qualified.

In some embodiments, the determining whether the first client meets a criterion as a user being allowed to send the retrieving request for the first data may include retrieving a terminal device information of the first client, and determining whether the first client is fraudulent or not in accordance with the terminal device information. The computing device may send a client identification information corresponding to the first client to a real-name verification database to determine whether the first client is matched with the information in the real-name verification database or not, if the first client is determined as not fraudulent. The computing device may send verification information to a mobile terminal device corresponding to the first client, and receiving the verification information, inputted by the first client, for examination, if the first client is determined as not fraudulent. The computing device may determine whether the first client meets the criterion of a safe loaning level in accordance with historical behavior recording information of the first client, if the examination is passed.

In some embodiments, the determining whether the first client meets the criterion as a user of a safe loaning level may further include notifying the first client whether he/she agrees a predetermined contract requirement and notifying the first client to input signature information, if the first client agrees. The computing device then examines the signature information while the signature information inputted by the first client is received, and then considers the predetermined contract requirement as being sustained if the examination is passed.

In some embodiments, the computing device may determine not to return a total of the third data or a part of the third data to the data processing server of the third party is processed if the first data equals to or is larger than the second data. The computing device may return a third data or a part of the third data to the third party data processing server is processed if the first data is smaller than the second data.

In some embodiments, the computing device may add an assigned amount in proportion to the remaining first total amount into the first total amount with respect to the retrieving request for the second data if a deadline for returning the third data to the data processing server of the third party exceeds a threshold value.

In some embodiments, the computing device may return a third data corresponding to a difference of amount between the first total amount and the second total amount to the data processing server of the third party.

In some embodiments, the computing device may acquire each retrieving request for a second data that is sent to the first client from each second client, in accordance with the retrieving request for the first data, and then transport the retrieving request for the second data corresponding to a confirmation response of the first client into the request pool.

Embodiments of the disclosure also relate to a system including a first server and a processing server of a third party. The first server may include a request receiving module configured to receive a retrieving request for a first data from a first client, wherein the retrieving request for the first data is sent from the first client to request data processing server of a third party to send the first data to the first client. The first server may also include a second total amount computation module configured to acquire each retrieving request for a second data that is sent to the first client from each second client. The second total amount computation module may then transport the retrieving requests for the second data into a request pool in accordance with the retrieving request for the first data, and compute an initial value of a second total amount of the second data in accordance with a second data corresponding to, in an order pool, the retrieving request for the second data.

In some embodiments, the first server may also include a first total amount computation module configured to notify a platform of the third party to send the corresponding first data to the first client in accordance with the second total amount, and to record a first total amount of the first data.

In some embodiments, the first server may also include a new second data retrieving request processing module configured to transport any new retrieving request for the second data into the request pool while any new retrieving request for the second data is acquired.

In some embodiments, the first server may include a confirmed request processing module configured to remove the retrieving request for the second data from the request pool while a message of confirming that the retrieving request for the second data has been accomplished is received, and to restart the computation of the second total amount in accordance with, in the request pool, the second data of the retrieving request for the second data.

In some embodiments, the first server may also include a comparison determining module configured to compare the second total amount with the first total amount as a comparing result, and for determining whether a total of a third data or a part of the third data is to be returned to the data processing server of the third party or not in accordance with the comparing result.

In some embodiments, the first server may also include a remaining first total amount computation module configured to restart the computation of the first total amount that is obtained as a remaining first total amount by subtracting the third data that is returned to the data processing server of the third party from the first total amount, and to return a process to the confirmed request processing module.

In some embodiments, the first server may also include a qualification determining module configured to determine whether the first client is qualified as being allowed to send the retrieving request for the first data or not, to return the process to the second total amount computing module or the first total amount computing module if the first client is qualified, and to suspend the retrieving request for the first data sent by the first client if the first client is not qualified.

In some embodiments, the first server may also include a first determining module configured to process a decision of not returning a total of the third data or a part of the third data to the data processing server of the third party if the first data equals to or is larger than the second data.

In some embodiments, the first server may also include a second determining module configured to process a decision of returning a third data or a part of the third data to the third party data processing server if the first data is smaller than the second data.

As compared to convenient technology, the present disclosure has the following advantages. By means of the utilization of a request pool (e.g., an order pool) in the present disclosure, when a first client initializes a retrieving request for a first data, every retrieving request for a second data in correspondence with the first client is directed to the pool so that the second data corresponding to each retrieving request for the second data is calculated as an initial value of a second total amount, and then a data processing server of a third party is notified to send a first total amount of the first data to the first client. Further, after the retrieving requests for the second data in the order pool changes, a determining procedure is processed in accordance with a comparison result that is compared between the second total amount of changed retrieving requests for the second data in the order pool and remaining first total amount obtained in the previous computation. If a criterion of the comparison result is not meet, a third data will not be returned to a data processing server of the third party. By the process as described above, it not only greatly decreases the amount of the retrieving requests for a first data but also decreases the number of times that the computing device returns the third data to the data processing server of the third party to therefore reduce the data throughput in the network. Under a condition that the same number of requests are processed, the occupation of network resource becomes lower to thus increase the efficacy of the network resource usage while the load of the first server is lower.

This Summary is not intended to identify all key features or essential features of the claimed subject matter, nor is it intended to be used alone as an aid in determining the scope of the claimed subject matter.

BRIEF DESCRIPTION OF THE DRAWINGS

The Detailed Description is described with reference to the accompanying figures. The use of the same reference numbers in different figures indicates similar or identical items.

DETAILED DESCRIPTION

To clarify the above objects, characteristics, and advantages of the present disclosure, the illustrating drawings are associated with the detailed description of embodiments in the following description.

In some embodiments, the retrieving requests that are sent by the second client, and not confirmed based on feedback from the first client, may be directed to a request pool. According to the request pool, a determining process is processed to determine whether a third data is to be as a compensating value for the first data that is sent by the data processing server of the third party. In these instances, the third data is obtained as the second client who makes the payment of the second data of the retrieving request for the second data. This process not only greatly decreases the amount of the retrieving requests for a first data but also decreases the number of times for returning the third data to the data processing server of the third party, therefore reducing the data throughput in the network and the load on the first server.

Figure 1:
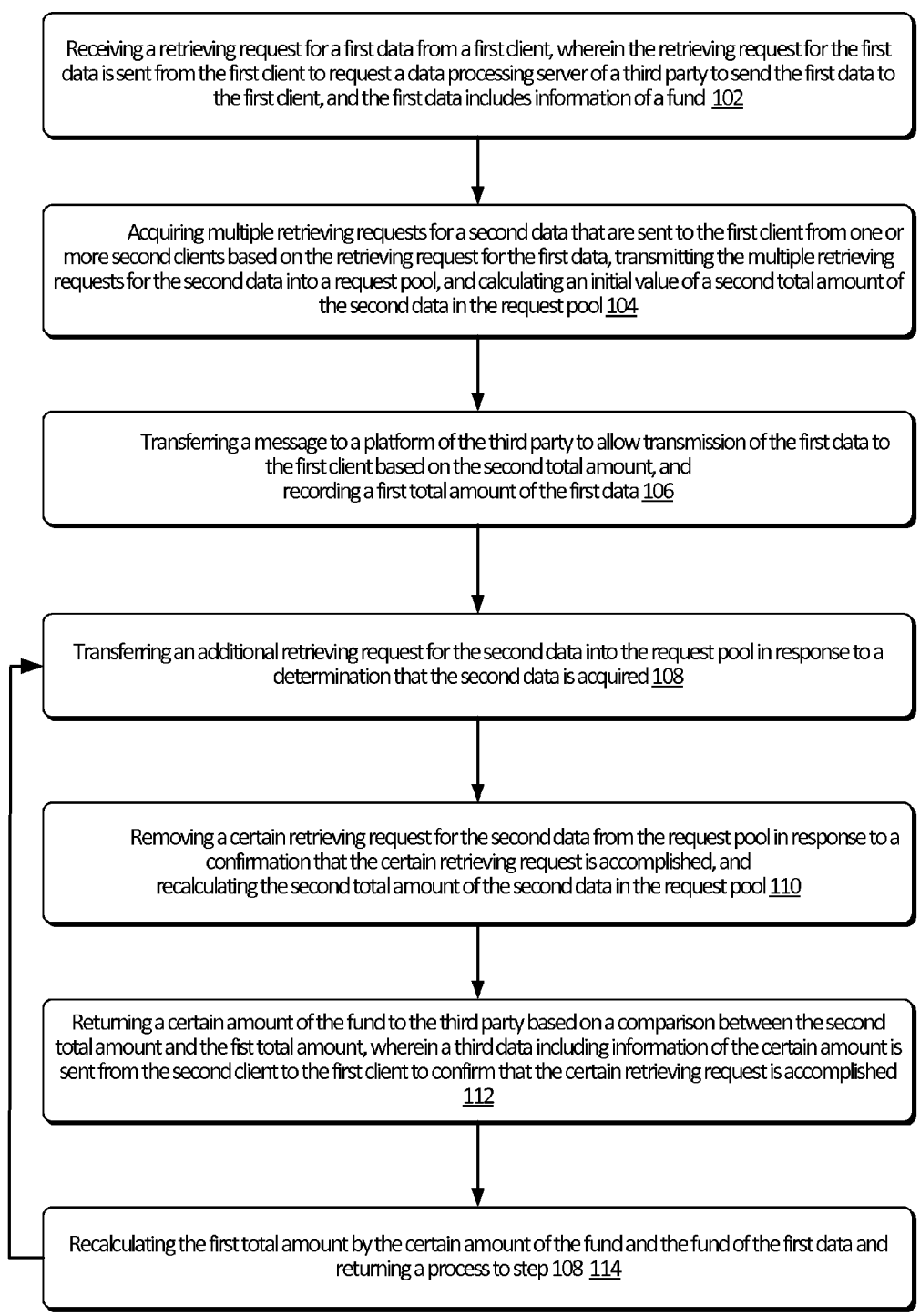
FIG. 1 is a flowchart illustrating a data processing method of the present disclosure.

FIG. 1 is a flowchart illustrating a data processing method of the present disclosure. At 102, a computing device (e.g., the first server) may include receiving, by a computing device, a retrieving request for a first data from a first client, wherein the retrieving request for the first data is sent from the first client to request a data processing server of a third party to send the first data to the first client. The computing device may send a retrieving request for the first data to a first server of the present disclosure if the first client is attempted to borrow a first data from the data processing server of the third party.

At 104, the computing device may acquire each retrieving request for a second data that is sent to the first client from each second client and transport the acquired retrieving requests for the second data into a request pool in accordance with the retrieving request for the first data. The computing device may compute an initial value of a second total amount of the second data in accordance with a second data corresponding to, in the request pool (e.g., an order pool), the retrieving request for the second data.

In some embodiments, the computing device may send the retrieving request for the second data to the first client if the first client in the network desires to acquire the second data of the second client. Since the first client, acting as a providing party of the second data, is able to provide the second data to any one of the second client, the computing device (e.g., the first client) may be corresponding to a plurality of the retrieving requests for the second data, wherein these retrieving requests for the second data may be sent from different first clients, and there is a probability that a single one of the first clients may send a plurality of the retrieving requests for the second data.

Accordingly, the computing device may acquire each retrieving request for the second data sent to the first client from each second client and transport the retrieving request for the second data into the request pool. And for the purpose of the following computation, the present disclosure further provides an order pool where the order pool collects each initial retrieving request for the second data in correspondence with the first client for further procedure.

Thus, in accordance with the first client's retrieving request for the first data, the computing device may calculate and obtain a second data total amount, also referred to as a second total amount, based on the second data corresponding to the retrieving request for the second data.

In some embodiments, the computing device may further transport the retrieving request for the second data into the request pool in accordance with the retrieving request for the first data. The first client is confirmed to respond to the second data with respect to each retrieving request for the second data sent from the second client to the first client.

In some embodiments, the computing device may receive the retrieving request for the second data from the second client so as to determine whether to respond to the retrieving request for the second data. For example, the computing device may determine whether to provide a first valuable price to the second client.

At 106, the computing device may notify a platform of the third party to send the corresponding first data to the first client in accordance with the second total amount, and record a first total amount of the first data.

After obtaining the second total amount by computation, the first server requests the data processing server of the third party to send the first data with corresponding amount, i.e. the first total amount, to the first client, and records the first total amount of the first data.

The operations 102-106 illustrate the initial process of the first server where the initial first total amount and second total amount is computed, after the first client initializes the retrieving request for the first data. The following operations 108-114 provide a looping process for the newly added retrieving request for the second data and the completion-confirmation of the retrieving request for the second data.

The following explains substantial procedures of data processing in the operations 102-106 by taking a seller, a buyer, and a server of a third financial organization in a networking transaction platform as an example.

The first client corresponds to the seller, the second client corresponds to the buyer, and the data processing server of the third party corresponds to the server of the third financial organization.

Each retrieving request for the second data sent from the second client to the first client can be a transactional order of a product that is not paid and not confirmed by the buyer after the seller has already delivered the product that is a commodity item brought by the buyer in the seller's website of the networking transaction platform. The second data is the total amount of the product in the transaction order. The third data is the payment that the buyer pays for the product of the order. The first data is a value of money that the server of the third financial organization loans to the buyer in accordance with the price that the seller sells the product to the buyer.

In some embodiments, the transaction order can be defined as an order of a product that the seller has already delivered and the buyer has already paid for, but the receiving confirmation for this product has not been made by the buyer. Thus, the risk of the loan of the server of the third financial organization may decrease. Of course, the transaction order may be defined in other ways. For example, the transaction order may be an order when the seller has already delivered the corresponding product.

As taking a transaction order that a buyer buys a product from a seller as an example, the request pool can be considered as the order pool.

When the seller requests the server of the third party financial organization to loan out the money in accordance the account receivable (AR) of the transaction order, the computing device firstly transports the transaction order sent from each buyer into the order pool and then computes the total amount of the account receivable A, i.e. the total amount of the second data. Then the computing device notifies the server of the third party financial organization to send the account receivable with corresponding amount B, i.e., the first total amount of the first data, to the seller. After the account receivable B is sent to the seller, the computing device records the account receivable B of the seller (i.e., the first total amount of the first data).

For example, there is a seller with the name of "a" that possesses transaction orders including a transaction order #1 of 100 dollars, a transaction order #2 of 200 dollars, and a transaction order #3 of 300 dollars which the seller is requesting. After the transportation of these transaction orders into the order pool, the account receivable of the seller "a", which is the second total amount, is computed as 600 dollars. Thus the credit that the seller requests the server of the third financial organization to loan out is 600 dollars, and the 600 dollars is recorded as the loaning value of the seller.

In some embodiments, after the operation 102, the computing device may generate a webpage of application form and issuing to a terminal of the first client after the first client receives a first request. The computing device may receive information transported from the webpage of apply form at the first client's terminal and then issuing the information of apply form to the first server according to a command of writing finished.

In some embodiments, the computing device may send initial identification information inputted to the first client for verification. If the times of verification failure reaches a threshold value, the computing device may suspend the retrieving request for the first data.

In some embodiments, the computing device may determine whether the first server has ever allowed the first client's retrieving request for the first data. In these instances, the computing device will determine whether the second total amount is smaller than a threshold value if the first server has ever allowed the retrieving request. The computing device may not send the verification information to a mobile terminal device corresponding to the first client if the second total amount is not smaller than the threshold value. The verification information inputted by the first client may be received for verification. The computing device may continue to send the verification information sent to a mobile terminal device corresponding to the first client if the second total amount is smaller than the threshold value. The verification information inputted by the first client may be received for verification.

In other words, the computing device determines whether the account receivable of the seller is smaller than a threshold value, such as two hundred thousand dollars ($200,000). The computing device may not require the first client to input the verification code, such as a mobile phone verification code, if the account receivable is smaller than the threshold value.

In such a manner, the first client's retrieving request for the first data including the information inputted by users is sent to the first server, wherein the information inputted by users may include the identification information of the users and so on.

For example, the retrieving request for the first data will be suspended if the user fails for a certain number of times to enter correct information, e.g., a company name, a company number, a username, or user's identification number.

Embodiments of this present disclosure also relate to techniques for preventing any malicious retrieving request for the second data from the second client and for preventing the system from notifying the data processing server of a third party to send large amounts of the first data because of an enormous amount of the retrieving request for the second data, which may result in a heavy loading of the third party's data processing server and enormous transfer data. The techniques may include determining, by the computing device, whether the first client is qualified as being allowed to send the retrieving request. For example, the computing device may determine whether the machine of the first client is being controlled by a Trojan program.

In some embodiments, the computing device may retrieve terminal device information of the first client, and determine whether the first client is fraudulent in accordance with the terminal device information.

For example, a Media Access Control (MAC) address of a terminal device of the first client may be acquired to send a ping message command to the terminal device allocated with the MAC address to determine whether the terminal device has the same MAC address as the device that sends the retrieving request for a first data. The terminal device of the first client is legal and not fraudulent if the addresses are the same.

In some embodiments, the computing device may require that the client identification information corresponding to the first client is sent to a real-name verification database to determine whether the first client is matched with the information in the real-name verification database if the addresses are different.

The retrieving request for the first data is suspended if the first client is matched with the information in the real-name verification database.

For a seller in the networking platform, he/she has its actual identification information. For example, for a personal seller, the identification information may include a personal name, a personal identification information, contact information, and so on. And for a company seller, the identification information may include a company name, a company registration number, a company's legal person's name, a company's legal person identification information, contact information, and so on. These kinds of identification information are stored in the real-name verification database of the first server. While the first client is matched with the information in the real-name verification database, it means that the first client is legal and not fraudulent.

In addition, the real-name verification database can be a database belonging to a third party.

In regards to the above operations, the related identification information of the first client may be entered to application forms and then be transported into the first server. The first server may match the identification information in the application form with the information in the real-name verification database.

In some embodiments, the computing device may send verification information to a mobile terminal device corresponding to the first client and the verification information entered by the first client is received for verification if the identification information is matched with the information in the real-name verification database.

For example, if the identification information is matched with the information in the real-name verification database, a verification code is sent to a mobile phone in association with the first client, and an interface of verification short message is generated in a terminal device of the first client. After a corresponding client enters the verification message into the first server and sends it to the first server, the first server receives the verification code entered by the first client to process the verification with the verification code sent to the first client. The verification may be locally stored.

The computing device may determine that the identification information is fraudulent if the identification information is not matched with the information in the real-name verification database. The computing device may then suspend the retrieving request for the first data.

In some embodiments, the computing device may determine whether the first client meets the criterion of a safe loaning level in accordance with historical behavior recording information of the first client.

Historical behavior recording information, such as transaction behavior information and credit recording information, is acquired to analyze whether the first client meets the criterion of a safe loaning level, such as very good, good, and bad level, if the verification is passed. The first client may be determined as meeting the criterion of a safe loaning level if its level is higher than the good level, or otherwise the retrieving request for the first data is suspended.

In some embodiments, the computing device may notify the first client whether he/she agrees to a predetermined contract requirement if the first client meets the criterion of a safe loaning level. The computing device may notify the first client to input a signature information if the first client agrees.

The computing device may verify the signature information after the signature information inputted by the first client is received. The computing device may then consider the predetermined contract requirement as being sustained if the examination is passed, and then return the process to the step after confirming the corresponding first total amount of the first data that is sent from the data processing server of the third party to the first client in accordance with the second total amount.

For a seller who applies for a loan, the seller indicates whether he/she agrees to the condition in a contract. The seller may sign the contact if the seller agrees. After the seller signs the contract, the signature information is verified. The condition of the contract is sustained and the server of third party's financial organization is notified to issue the loan to the first client if the verification is passed.

In some embodiments, the operation may advance to the operation 104 if the first client has passed the verification as meeting the criterion of a safe loaning level. However, the computing device may suspend retrieving request for the first data if the verification is not passed.

In some embodiments, the computing device may determine whether the first server has ever allowed the first client's retrieving request for the first data. Then, the computing device may determine whether the second total amount is smaller than a threshold value after the first server has ever allowed the retrieving request for the first data. The computing device may notify the seller about the contract terms and whether he/she accepts those terms if the second total amount is smaller than the threshold value.

In some embodiments, the first client may not need to enter a verification code, such as a mobile verification code. In these instances, the operation advances to the operation 106 if the first client has passed the verification as meeting the criterion of a safe loaning level.

At 108, the computing device may transport any new retrieving request for the second data into the request pool after any new retrieving request for the second data arrive.

The operations 108-114 will be described in detail as follows by taking a seller, a buyer, and a server of the third financial organization as mentioned above as an example.

Suppose that the seller "a" is active in the networking platform, and a buyer "b" has ordered two new transaction orders including a order #4, which is 50 dollars, and a order #5, which is 80 dollars. As a result, the computing device may direct the new transaction order: the order 4 and the order #5, to be placed into the request pool (e.g., the order pool).

At 110, the computing device may remove the retrieving request for the second data will be removed from the request pool after a message indicating a confirmation of completion of the retrieving request for the second data has been received. Then, the computing device may restart a computation of the second total amount in accordance with, in the request pool, the second data of the retrieving request for the second data.

In other words, the retrieving request for the second data may be removed from the request pool in an attempt to restart a computation of a second total amount of the second data corresponding to the retrieving requests that are currently presented in the request pool for the second data after the computing device receives a message indicating a confirmation of completion of the retrieving request for the second data has been received.

For example, a transaction order #1 in the order pool has been confirmed as being received by the buyer who then makes the payment of 100 dollars; so the transaction order #1 will be removed from the order pool. Therefore, there are transaction orders including the transaction order #2, which is 200 dollars, the transaction order #3, which is 300 dollars, the transaction order #4, which is 50 dollars, and the transaction #5, which is 80 dollars, where there are 630 dollars for the second total amount in the order pool. In these instances, a message of confirming the completion of the retrieving request for the second data may be obtained if the second client with his/her ID applies the second valuable data as the paying value to pay for the first valuable data of the retrieving request. Then, a response from the first client with his/her ID as a confirmation for the above payment may be received.

At 112, the computing device may compare the second total amount with the first total amount as a comparison result, and determine whether a total of a third data or a part of the third data is to be returned to the data processing server of the third party or not in accordance with the comparing result. The third data corresponds to a confirmation data that confirms the accomplishment of the retrieving request for the second data.

As mentioned above, after the first client receives the retrieving requests for the second data sent from the second client, the second client can respond as a confirmation with respect to the retrieving requests for the second data. The confirmation may be a message that requests the delivery of the product of the transaction order, in which the product can be either an entity product, such as a toy, or a virtual product, such as a card number and a password of a top-up card.

The buyer may be required to pay for the second data corresponding to the retrieving request for the second data, i.e. the corresponding product information, and further required to confirm that the product corresponding to the retrieving request for the second data is received. In the present disclosure, a buyer can pay the money while the retrieving request for the second data is being sent, i.e. before the seller delivers the product. Alternatively, a buyer can pay the money by usage of a third data after the product corresponding to the retrieving request for the second data is received.

In some embodiments, the computing device may not return a total of a third data or partial third data to the data processing server of the third party if the second total amount equals to or is larger than the first total amount.

For example, if the current first total amount is 600 dollars, when the second total amount, which is 630 dollars, is larger than the first total amount, the amount of money, i.e., 100 dollars, paid by the buyer is not required to be returned to the data processing server of the third party.

F In some embodiments, the computing device may return a total of a third data or a part of the third data to the data processing server of the third party if the second total amount is smaller than the first total amount.

The third data which is returned to the data processing platform can be a value of difference between the second total amount and the first total amount. Of course the third data can be returned in other manners.

In the above example, the transaction orders now in the order pool include: an order #3 of 300 dollars, an order #4 of 50 dollars, and an order #5 of 80 dollars if there is another buyer who generates a transaction order #2, confirms the receiving of the product, and makes the payment of 200 dollars. At step 110, the calculation of the second total amount may be restarted with a result of 430 dollars, which is smaller than the first total amount of 600 dollars; therefore 170 dollars of the current received transaction order 2, which is in total of 200 dollars, will need to be returned to the server of the third party of financial organization.

At 114, the computing device may restart the computation of the first total amount that is obtained as a remaining first total amount by subtracting the third data, that is returned to the data processing server of the third party, from the first total amount if the total of the third data or the partial third data is returned to the data processing server of the third party. Then, the operation may loop back to the operation 108.

In some embodiments, the first data that is sent from the data processing server of the third party to the first client is partially paid back after the total of the third data or a partial third data is returned to the data processing server of the third party. In other words, the corresponding first total amount is changed. At this time, the first total amount is to be computed in consideration of a situation after the first client is changed. Therefore, a remaining first total amount may be obtained by subtracting the third data from the first total amount.

Using the above example, the current first total amount is 600 dollars in which there is 170 dollars paid back, so the remaining first total amount is 430 dollars. And if 200 dollars thereof is paid back, the remaining first total amount is 400 dollars.

In some embodiments, the computing device may restart the computation of the first total amount that is obtained as a remaining first total amount by subtracting the third data that is returned to the data processing server of the third party from the first total amount after the total of the third data or the part of the third data has returned to the data processing server of the third party. The computing device may add an assigned amount in proportion to the remaining first total amount into the first total amount with respect to the retrieving request for the second data if a deadline for returning the third data to the data processing server of the third party exceeds a threshold value.

For example, a buyer makes the payment and receives items for over 5 days. Therefore, the computing device may start to compute the interest of the loans, which is a specific ratio of the first total amount, and the computed interest money may be added to the first total amount to generate a new first total amount.

Alternatively, the computing device may, from the date that the server of the third party of financial organization server sends the first data to the seller, start to compute the interest of the remaining loan that is not paid back as the remaining first total amount for every single day and add the value to the first total amount from the time that.

In this instance, the first server can request a process for a large amount of retrieving requests for the second data once the first client receives a single retrieving request for the first data from the first client. So, an amount of the first client's retrieving requests for the first data is reduced. In addition, the computing device may not send the notice to the data processing server of the third party if the total amount of the increasing second data in correspondence to the new transaction orders that are added to the order pool is larger than the total amount of the removed second data in correspondence to the transaction orders that are removed from the order pool.

Figure 2:
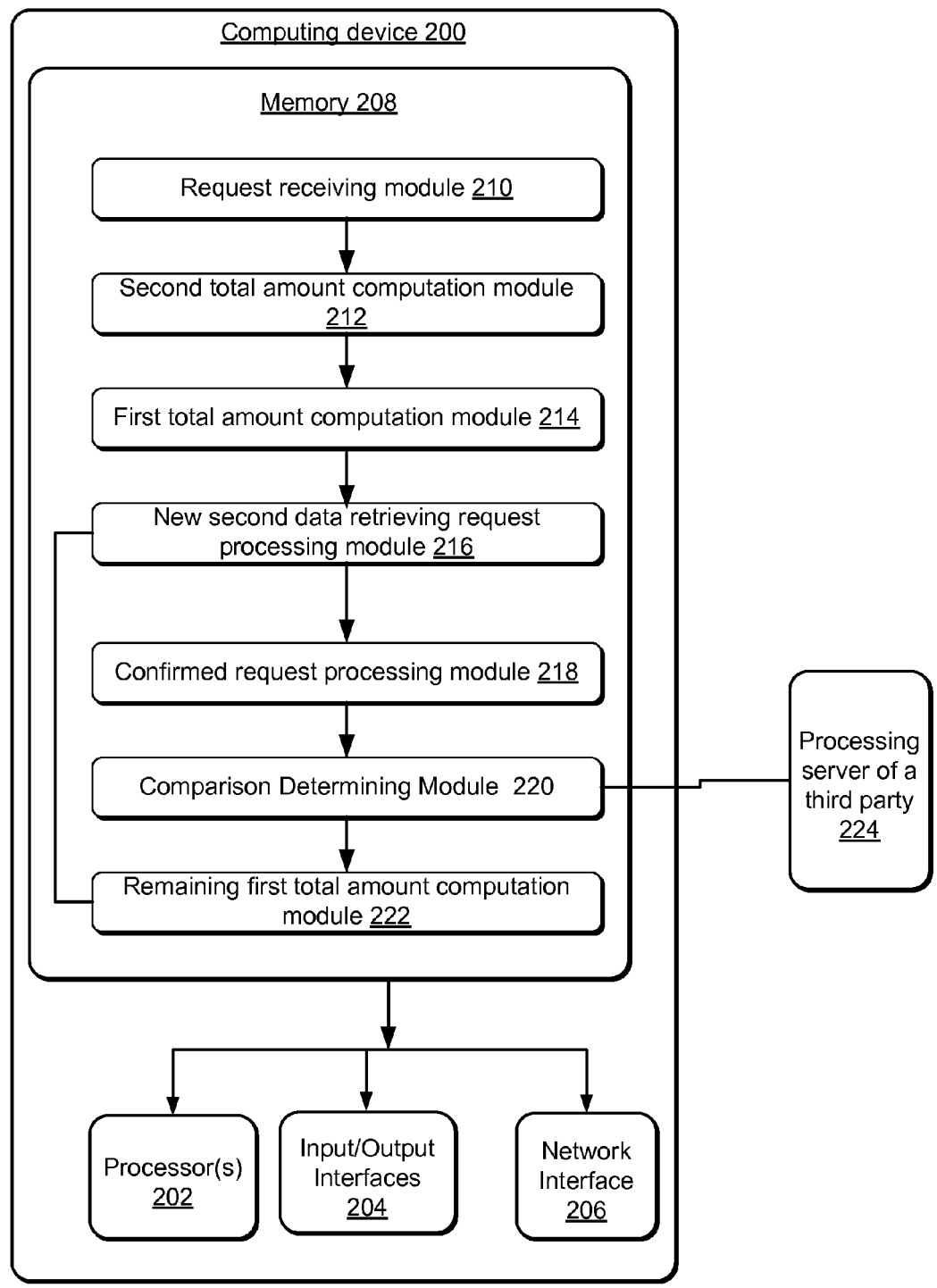
FIG. 2 is a schematic diagram of illustrative computing architectures that enable data processing.

FIG. 2 is a schematic diagram of illustrative computing architectures that enable data processing. The computing architectures include a computing device 200. The computing device 200 may be a user device or a server (e.g., the first server) for a multiple location login control. In one exemplary configuration, the computing device 200 includes one or more processors 202, input/output interfaces 204, network interface 206, and memory 208.

The memory 208 may include computer-readable media in the form of volatile memory, such as random-access memory (RAM) and/or non-volatile memory, such as read only memory (ROM) or flash RAM. The memory 208 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 208 in more detail, the memory 208 may include a request receiving module 210, a second total amount computation module 212, a first total amount computation module 214, a new second data retrieving request processing module 216, a confirmed request processing module 218, a comparison determining module 220, and a remaining first total amount computation module 222.

The request receiving module 211 may be configured to receive a retrieving request for a first data from a first client, wherein the retrieving request for the first data is sent from the first client to request data processing server of a third party to send the first data to the first client.

The second total amount computation module 212 may be configured to acquire each retrieving request for a second data that is sent to the first client from each second client and to then transport the retrieving requests for the second data into a request pool in accordance with the retrieving request for the first data. The second total amount computation module 212 may be configured to further compute an initial value of a second total amount of the second data in accordance with a second data corresponding to, in an order pool, the retrieving request for the second data.

The first total amount computation module 214 may be configured to notify a platform of the third party to send the corresponding first data to the first client in accordance with the second total amount, and to record a first total amount of the first data.

The new second data retrieving request processing module 216 may be configured to transport any new retrieving request for the second data into the request pool while any new retrieving request for the second data is acquired.

The confirmed request processing module 218 may be configured to remove the retrieving request for the second data from the request pool while a confirmation message that the retrieving request for the second data has been accomplished is received, and to restart the computation of the second total amount in accordance with, in the request pool, the second data of the retrieving request for the second data.

The comparison determining module 220 may be configured to compare the second total amount with the first total amount as a comparing result, and to determine whether a total of a third data or a part of the third data is to be returned to the data processing server of the third party or not in accordance with the comparing result.

The remaining first total amount computation module 222 may be configured to restart the computation of the first total amount that is obtained as a remaining first total amount by subtracting the third data that is returned to the data processing server of the third party from the first total amount, and to return a process to the confirmed request processing module.

The computing device may also include a qualification determining module configured to determine whether the first client is qualified as being allowed to send the retrieving request for the first data, and to return the process to the second total amount computing module or the first total amount computing module if the first client is qualified. The qualification determining module may suspend the retrieving request for the first data sent by the first client if the first client is not qualified.

The comparison determining module 220 may include a first determining module configured to process a decision of not returning a total of the third data or a part of the third data to the data processing server of the third party if the first data equals to or is larger than the second data. The comparison determining module 220 may also include a second determining module configured to process a decision of returning a third data or a part of the third data to the third party data processing server if the first data is smaller than the second data.

The computing architectures may also include a processing server of a third party 224 connecting to the computing device 200.

With respect to embodiments of the system, similar embodiments may be found in the embodiments of the above-mentioned methods. The explanation for every embodiment may be different from each other, where embodiments may be combined to implement certain functions of the system.

The present disclosure can be applied in numerously general or specific computing system or allocation, such as a personal computer, a first server computer, a handheld terminal device, a portable terminal device, a tablet terminal device, a multi-processor system, a system based on microprocessor, a networking PC, a minicomputer, a mainframe computer, and a distributed computing environment including any above systems and terminal devices. The present disclosure is preferably used in an embedded system.

The present disclosure can be described in a general context of computer executable instructions, such as a program module. Generally, the program module includes routines, programs, objects, components, data structures, etc. that performs particular tasks or implements particular abstract data types. The present disclosure can also be practiced in a distributed computing environment. In such distributed computing environment, the task is performed in a remote processing terminal which is connected via the communicating networks. In a distributed computing environment, the program module may be located in a remote and local computer storage media including storage terminal equipment.

It should be noted that terms such as "the first" and "the second" is for distinguishing one object/operation from another object operation, and they should not be deemed as existing the requirement or implication for the real relationship among these objects/operations.

Some embodiments of the present disclosure have been described, however once the basic inventive concepts of the present disclosure is learned by a person skilled in the art, these embodiments can be modified and changed. Therefore, the appended embodiments are intended to be interpreted as including the embodiments and all changes and modifications falling within the scope of the present disclosure.

Although there is provided embodied examples for describing a method and a system for processing data of the present application, the description of the embodiments is only for helping people to understand the principle and its core concept. For people with ordinary skill in the art are capable of changing the specific embodiments and a practical range according to the concept of the present disclosure. Accordingly, the contents above should not be interpreted as a restriction to the present disclosure.

What is claimed is:

1. A method for processing data, comprising:
receiving a retrieving request for a first data from a first client, wherein the retrieving request for the first data is sent from the first client to request a data processing server of a third party to send the first data to the first client, and the first data includes information of a first fund;
acquiring multiple retrieving requests for a second data that are sent to the first client from one or more second clients based on the retrieving request for the first data;
transmitting the multiple retrieving requests for the second data into a request pool;
calculating a second total amount of a second fund associated with the second data in the request pool;
determining whether the second total amount of the second fund is smaller than a threshold value;
sending a verification code to a terminal device corresponding to the first client to request the first client to input the verification code for verification in response to determining that the second total amount of the second fund is not smaller than the threshold value; or
determining not to require the first client to input the verification code for verification in response to determining that the second total amount of the second fund is smaller than the threshold value;
transmitting a message to a platform of the third party to allow transmission of the first data to the first client based on the second total amount;
removing a certain retrieving request for the second data from the request pool in response to a confirmation that the certain retrieving request is accomplished; and
recalculating the second total amount of the second data in the request pool.

2. The method of claim 1, further comprising:
recording a first total amount of the first data; and
transmitting an additional retrieving request for the second data into the request pool in response to a determination that the second data is acquired.

3. The method of claim 1, further comprising:
returning a certain amount of the first fund to the third party based on a comparison between the second total amount and a first total amount of the first data, wherein a third data including information of the certain amount is sent from the second client to the first client to confirm that the certain retrieving request is accomplished; and
recalculating the first total amount based on the certain amount of the first fund of the first data.

4. The method of claim 1, further comprising:
suspending the retrieving for the first data sent by the first client in response to a determination that the first client is not qualified as being allowed to send the retrieving request for the first data.

5. The method of claim 1, further comprising:
retrieving terminal device information of the terminal device corresponding to the first client;
sending a client identification information corresponding to the first client to a real-name verification database to determine whether the first client is matched with information in the real-name verification database in response to a determination that the first client is not fraudulent based on the terminal device information;
sending verification information to the terminal device corresponding to the first client;
receiving the verification information from the first client; and
determining whether the first client meets the criterion of a safe loan level based on historical behavior recording information of the first client.

6. The method of claim 1, further comprising:
requesting the first client to input signature information in response to a determination that the first client agrees to a predetermined contract requirement;
examining the signature information while the signature information inputted by the first client is received; and
notifying the first client that the predetermined contract requirement is sustained if the examination is passed.

7. The method of claim 1, further comprising:
returning a total of the third data or a part of the third data to a data processing server of the third party if the first fund equals to or is larger than the second fund; and
restraining from returning a third data or a part of the third data to the third party data processing server if the first fund is smaller than the second fund.

8. The method of claim 1, further comprising:
adding an assigned amount in a proportion to a remaining first total amount into the first total amount if a deadline for returning the third data to the data processing server of the third party exceeds a threshold value.

9. The method of claim 1, further comprising:
returning the third data based on a difference of amount between the first total amount and the second total amount to the data processing server of the third party.

10. The method of claim 1, further comprising:
acquiring each retrieving request of the multiple retrieving requests for a second data that is sent to the first client from each of the one or more second clients in response to the retrieving request for the first data; and
placing the each retrieving request for the second data corresponding to a confirmation response of the first client into the request pool.

11. A system comprising:
one or more processors; and
memory to maintain a plurality of components executable by the one or more processors, the plurality of components comprising:
a request receiving module configured to receive a retrieving request for a first data from a first client, wherein the retrieving request for the first data is sent from the first client to request a data processing server of a third party to send the first data to the first client;

a second total amount computation module configured to:

acquire multiple retrieving requests for a second data that are sent to the first client from one or more second clients based on the retrieving request for the first data;

transmit the multiple retrieving requests for the second data into a request pool;

calculate a second total amount of a second fund associated with the second data in the request pool;

determine whether the second total amount of the second fund is smaller than a threshold value; and send a verification code to a mobile terminal device corresponding to the first client to request the first client to input the verification code for verification in response to determining that the second total amount of the second fund is not smaller than the threshold value; or determining not to require the first client to input the verification code for verification in response to determining that the second total amount of the second fund is smaller than the threshold value;

a first total amount computation module configured to transmit a message to a platform of the third party to allow transmission of the first data to the first client based on the second total amount; and a confirmed request processing module configured to:

remove a certain retrieving request for the second data from the request pool in response to a confirmation that the certain retrieving request is accomplished; and recalculate the second total amount of the second data in the request pool.

12. The system of claim 11, wherein the plurality of components further comprise a new second data retrieving request processing configured to transmit an additional retrieving request for the second data into the request pool in response to a determination that the second data is acquired, and the first total amount computation module is further configured to record a first total amount of the first data.

13. The system of claim 11, wherein the plurality of components further comprise a comparison determining module configured to:

return a certain amount of the first fund to the third party based on a comparison between the second total amount and a first total amount of the first data, wherein a third data including information of the certain amount is sent from the second client to the first client to confirm that the certain retrieving request is accomplished; and recalculate the first total amount based on the certain amount of the first fund of the first data.

14. The system of claim 11, wherein the plurality of components further comprise a qualification determining module configured to suspend the retrieving request for the first data sent by the first client in response to a determination that the first client is qualified as being allowed to send the retrieving request for the first data.

15. The system of claim 11, wherein the comparison determining module comprises:

a first determining module configured to return a total of the third data or a part of the third data to a data processing server of the third party if the first fund equals to or is larger than the second fund; and a second determining module configured to retrain from returning a third data or a part of the third data to the third party data processing server if the first fund is smaller than the second fund.

16. One or more computer-readable media storing computer-executable instructions that, when executed by one or more processors, instruct the one or more processors to perform acts comprising:

receiving a retrieving request for a first data from a first client, wherein the retrieving request for the first data is sent from the first client to request a data processing server of a third party to send the first data to the first client, and the first data includes information of a first fund;

acquiring multiple retrieving requests for a second data that are sent to the first client from one or more second clients based on the retrieving request for the first data;

transmitting the multiple retrieving requests for the second data into a request pool;

calculating a second total amount of a second fund associated with the second data in the request pool;

determining whether the second total amount of the second fund is smaller than a threshold value;

sending a verification code to a terminal device corresponding to the first client to request the first client to input the verification code for verification in response to determining that the second total amount of the second fund is not smaller than the threshold value; or determining not to require the first client to input the verification code for verification in response to determining that the second total amount of the second fund is smaller than the threshold value;

transmitting a message to a platform of the third party to allow transmission of the first data to the first client based on the second total amount;

removing a certain retrieving request for the second data from the request pool in response to a confirmation that the certain retrieving request is accomplished; and recalculating the second total amount of the second data in the request pool.

17. The one or more computer-readable media of claim 16, wherein the acts further comprise:

recording a first total amount of the first data; and transmitting an additional retrieving request for the second data into the request pool in response to a determination that the second data is acquired.

18. The one or more computer-readable media of claim 16, wherein the acts further comprise:

returning a certain amount of the first fund to the third party based on a comparison between the second total amount and a first total amount of the first data, wherein a third data including information of the certain amount is sent from the second client to the first client to confirm that the certain retrieving request is accomplished; and recalculating the first total amount based on the certain amount of the first fund of the first data.

19. The one or more computer-readable media of claim 16, wherein the acts further comprise:

suspending the retrieving request for the first data sent by the first client in response to a determination that the first client is qualified as being allowed to send the retrieving request for the first data.

20. The one or more computer-readable media of claim 16, wherein the acts further comprise:

retrieving terminal device information of the terminal device corresponding to the first client;

sending a client identification information corresponding to the first client to a real-name verification database to determine whether the first client is matched with information in the real-name verification database in response to a determination that the first client is not fraudulent based on the terminal device information;

sending verification information to the terminal device corresponding to the first client;

receiving the verification information from the first client; and determining whether the first client meets the criterion of a safe loan level based on historical behavior recording information of the first client.

* * * * *